United States Patent
Monden

(10) Patent No.: US 11,206,379 B2
(45) Date of Patent: Dec. 21, 2021

(54) CONTROLLED APPARATUS AND CONTROL METHOD THEREOF

(71) Applicant: CANON KABUSHIKI KAISHA, Tokyo (JP)

(72) Inventor: Kazuhiro Monden, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 592 days.

(21) Appl. No.: 16/057,901

(22) Filed: Aug. 8, 2018

(65) Prior Publication Data
US 2019/0052849 A1 Feb. 14, 2019

(30) Foreign Application Priority Data
Aug. 10, 2017 (JP) .............................. JP2017-155879

(51) Int. Cl.
*H04N 9/31* (2006.01)
(52) U.S. Cl.
CPC ......... *H04N 9/3179* (2013.01); *H04N 9/3147* (2013.01)
(58) Field of Classification Search
CPC ..................... H04N 9/3179; H04N 9/3147
USPC ........................................................ 353/94
See application file for complete search history.

(56) References Cited

U.S. PATENT DOCUMENTS

| 10,001,961 B2 * | 6/2018 | Koshihashi | G06F 3/1446 |
| 2010/0107018 A1 * | 4/2010 | Benenson | G06F 11/324 |
| | | | 714/57 |

FOREIGN PATENT DOCUMENTS

JP 2007-079940 A 3/2007

* cited by examiner

*Primary Examiner* — Jerry L Brooks
(74) *Attorney, Agent, or Firm* — Cowan, Liebowitz & Latman P.C.

(57) ABSTRACT

A controlled apparatus that operates as a first controlled apparatus, comprises a communication unit configured to communicate with a second controlled apparatus, a detection unit configured to detect a second controlled apparatus having a predetermined relationship with the first controlled apparatus via the communication unit, and a control unit configured to generate a first web page capable of controlling the first controlled apparatus if the detection unit has not detected the second controlled apparatus having the predetermined relationship, and generate a second web page capable of collectively controlling the first controlled apparatus and the second controlled apparatus, if the detection unit has detected the second controlled apparatus having the predetermined relationship.

12 Claims, 6 Drawing Sheets

CONTROLLED APPARATUS AND CONTROL METHOD THEREOF

BACKGROUND OF THE INVENTION

Field of the Invention

The present invention relates to a system in which a plurality of apparatuses cooperate to perform processing.

Description of the Related Art

A known example of processing performed by a plurality of apparatuses working in cooperation is a method of image projection called multiple projection in which projection screens (projection image plane) projected by a plurality of projection apparatuses are joined together into a single image as a whole. In multiple projection, various processing is performed, such as matching the brightness and the tint of the projection screens from each projection apparatus and a technique called "edge blending," which is used to render the joints inconspicuous. Moreover, in certain cases, a technique called "keystone correction" is also performed to prevent occurrence of geometrical distortion called "trapezoidal distortion" on the projection screen.

The foregoing processing can be carried out by various techniques, such as by controlling the projection apparatuses with a remote controller and by transmitting adjustment commands to the projection apparatuses via a network to perform control. In particular, the technique to control a plurality of projection apparatuses via a network is especially effective in the adjustment of the operation of the projection apparatuses as this technique does not cause channel interferences unlike infrared remote controllers and offers a higher degree of freedom in wiring than wired remote controllers.

While techniques to control projection apparatuses via a network include those that utilize standards, such as PJLink, a technique to control the projection apparatuses via web pages delivered by a web server is also useful if the projection apparatuses are provided with web server functionality. The technique to implement control via web pages can be used as long as a web browser is installed, for example, on a personal computer or a smart phone as standard since this eliminates the need to install predetermined application software.

Japanese Patent Laid-Open No. 2007-79940 describes a method of controlling projection apparatuses via web pages in which a projection apparatus obtains information about other projection apparatuses that are not provided with web server functionality and adds a page for controlling the other projection apparatuses to its web page for controlling the projection apparatus.

The method disclosed in Japanese Patent Laid-Open No. 2007-79940, however, falls short of implementation of efficient control of a plurality of projection apparatuses for multiple projection. This is because, for example, when controlling projection apparatuses for multiple projection via, a web page, there are two situations in one of which it is desired to collectively control all the projecting apparatuses while in the other situation, it is desired to individually control these apparatuses. For example, to adjust the brightness and the tint of the projection screen of multiple projection, one possible approach is to first set the same value collectively for all the projection apparatuses to perform rough adjustment, which is followed by fine adjustment of each apparatus. In this way, when a plurality of apparatuses cooperate to perform processing, there are cases where it is desired to control all the apparatuses collectively while there are other occasions where it is desired to individually control the apparatuses.

SUMMARY OF THE INVENTION

The present invention has been made in consideration of the aforementioned problems, and realizes a technique capable of controlling each apparatus in an efficient manner when a plurality of apparatuses cooperate to perform processing.

In order to solve the aforementioned problems, the present invention provides a controlled apparatus that operates as a first controlled apparatus, comprising: a communication unit configured to communicate with a second controlled apparatus; a detection unit configured to detect a second controlled apparatus having a predetermined relationship with the first controlled apparatus via the communication unit; and a control unit configured to generate a first web page capable of controlling the first controlled apparatus if the detection unit has not detected the second controlled apparatus having the predetermined relationship, and generate a second web page capable of collectively controlling the first controlled apparatus and the second controlled apparatus, if the detection unit has detected the second controlled apparatus having the predetermined relationship.

In order to solve the aforementioned problems, the present invention provides a control method of a controlled apparatus that includes a communication unit configured to communicate with a second controlled apparatus and operates as a first controlled apparatus, the method comprising: detecting a second controlled apparatus having a predetermined relationship with the first controlled apparatus via the communication unit; generating a first web page capable of controlling the first controlled apparatus if the second controlled apparatus having the predetermined relationship is not detected; and generating a second web page capable of collectively controlling the first controlled apparatus and the second controlled apparatus if the second controlled apparatus having the predetermined relationship is detected.

In order to solve the aforementioned problems, the present invention provides a non-transitory computer-readable storage medium storing a program for causing a computer to function as a controlled apparatus that operates as a first controlled apparatus, comprising: a communication unit configured to communicate with a second controlled apparatus; a detection unit configured to detect a second controlled apparatus having a predetermined relationship with the first controlled apparatus via the communication unit; and a control unit configured to generate a first web page capable of controlling the first controlled apparatus if the detection unit has not detected the second controlled apparatus having the predetermined relationship, and generate a second web page capable of collectively controlling the first controlled apparatus and the second controlled apparatus, if the detection unit has detected the second controlled apparatus having the predetermined relationship.

According to the present invention, it is possible to control a plurality of apparatuses collectively and each of the apparatuses individually in an efficient manner when the apparatuses cooperate to perform processing.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, a first embodiment will be described.

In this embodiment, a projection system using a plurality of projection apparatuses is described as an example of a system in which a plurality of apparatuses cooperate to perform processing. In the projection system of this embodiment, a plurality of projection apparatuses and an information processing apparatus for controlling each of the projection apparatuses are communicatively connected via a network so as to perform multiple projection in which projection screens (projection image planes) projected by the plurality of projection apparatuses are joined together into a single image as a whole.

(System Configuration)

First, the projection system of this embodiment will be described with reference to FIG. 1.

Figure 1:
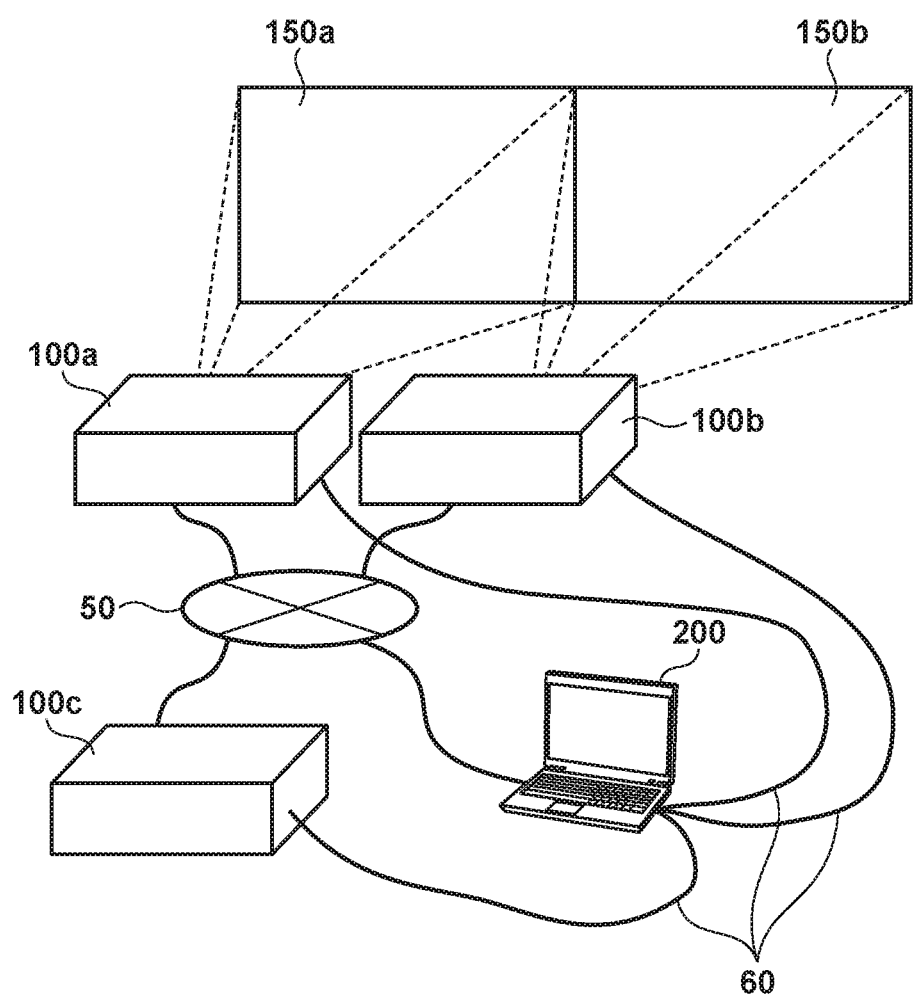
FIG. 1 is a view showing a system configuration of an embodiment of the present invention.

FIG. 1 illustrates an exemplary system configuration for performing multiple projection using two projection apparatuses.

In FIG. 1, a first projection apparatus 100a and a second projection apparatus 100b perform multiple projection while a third projection apparatus 100c is located on the same network but are not involved in the multiple projection. The first to third projection apparatuses 100a, 100b, and 100c and the single information processing apparatus 200 are connected so as to be capable of communicating with each other via a network 50, such as a LAN (Local Area Network). Additionally, the first to third projection apparatuses 100a, 100b, and 100c are connected to an image output apparatus (not shown) via video cables 60. The unshown image output apparatus outputs video signals to the first and second projection apparatuses 100a and 100 that perform multiple projection via the video cables 60. The image output apparatus may be any suitable apparatus as long as it is capable of outputting video signals, such as a personal computer, a camera, a cellular phone, a smart phone, a hard disk recorder, a game machine, etc. In this embodiment, the information processing apparatus 200 also serves as the image output apparatus.

The information processing apparatus 200, for example, is a personal computer (PC), and controls the first to third projection apparatuses 100a, 100b, and 100c connected thereto via the network 50.

This embodiment describes liquid crystal projectors as examples of projection apparatuses. While known types of liquid crystal projectors include single- and three-plate type liquid crystal projectors, either type of projector will suffice. In the liquid crystal projector of this embodiment, the transmittance of the light through the liquid crystal devices is controlled according to the image to be displayed so as to project the light from the light source through the liquid crystal devices onto the screen, thereby presenting the image to the user. In FIG. 1, the first and second projection apparatuses 100a and 100b form a multiple projection screen composed of respective projection screens 150a and 150b that are arranged horizontally adjacent to each other.

In this embodiment, for the ease of understanding, a case in which the two projection apparatuses 100a and 100b shown in FIG. 1 are used to perform multiple projection will be described; however, the number and the arrangement of the projection apparatuses are not so limited.

(Apparatus Configuration)

Figure 2:
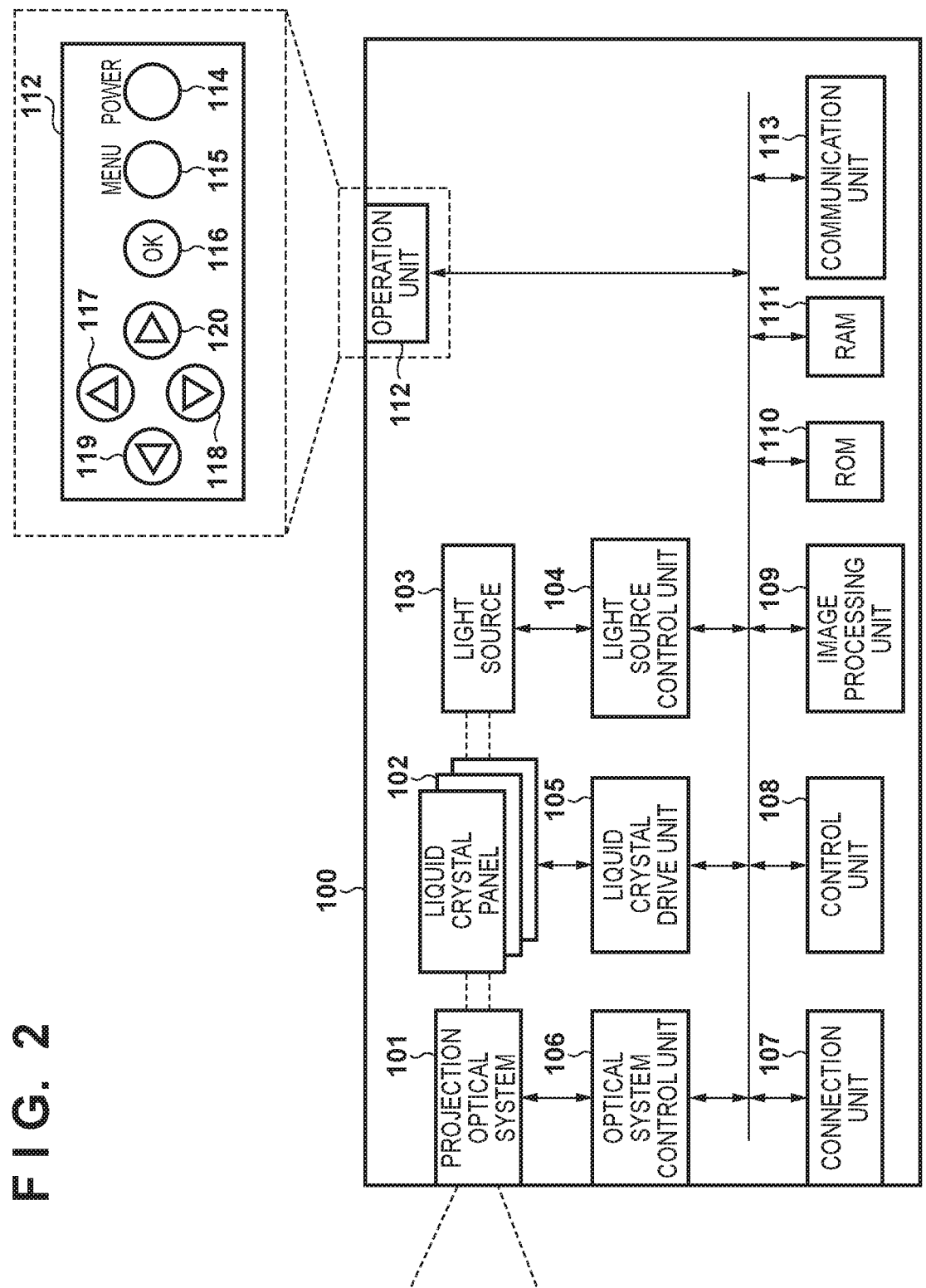
FIG. 2 is a block diagram showing the configuration of projection apparatuses of the embodiment.

Next, the configuration and the functions of the first to third projection apparatuses 100a, 100b, and 100c included in the projection system of this embodiment will now be described with reference to FIG. 2.

Each of the first to third projection apparatuses 100a, 100b, and 100c (collectively referred to as the projection apparatuses 100) includes a projection optical system 101, liquid crystal panels 102, a light source 103, a light source control unit 104, a liquid crystal drive unit 105, and an optical system control unit 106. Furthermore, the projection apparatus 100 include a connection unit 107, a control unit 108, an image processing unit 109, a ROM 110, a RAM 111, an operation unit 112, and a communication unit 113.

The projection optical system 101 projects the videos generated through the liquid crystal panels 102 onto the screen. The projection optical system 101 includes a plurality of lenses and lens actuators for driving the lenses, so that the projection optical system 101 can perform various functions, such as enlargement, reduction, and focal adjustment of the project image by driving the lenses with the actuators.

The liquid crystal panels 102 generate images respectively for the colors (red (R), green (G), and blue (B)) from the light that is emitted from the light source 103 and separated into these colors by mirrors (not shown).

The light source 103 generates light to project videos onto the screen and may be a halogen lamp, a xenon lamp, a high pressure mercury lamp, a laser light source, etc.

The light source control unit 104 is constituted by a microprocessor for performing ON/OFF control of the light source 103 and controlling the quantity of light therefrom. Additionally, the light source control unit 104 need not be a dedicated microprocessor; rather, the control unit 108 may be caused by a program stored on the ROM 110 to perform the same processing as the light source control unit 104.

The liquid crystal drive unit 105 adjusts the light transmittance of each color from the liquid crystal panels 102 to reproduce each of the RGB colors based on the video signals inputted by the image processing unit 109.

The optical system control unit 106 controls the projection optical system 101 to adjust the zoom magnification, the shift amount, the focus, etc.

The connection unit 107 is an interface for connecting with the image output apparatus via a video cable 60 for receiving video signals, audio signals, control signals, etc., from the image output apparatus. The connection unit 107 includes, for example, a composite interface, an S-video interface, a D terminal, a component interface, an analog RGB interface, a DVI-I terminal, a DVI-D terminal, an HDMI® interface, etc. Moreover, if receiving analog video signals, the connection unit 107 converts the received analog video signals to digital video signals and transmits the converted signals to the image processing unit 109.

The control unit 108 includes a CPU or MPU that develops and execute, in the RAM 111, control programs stored in the ROM 110 to control the various units of the projection apparatus 100 and control the operating condition and the operating mode of the projection apparatus 100.

The image processing unit 109 changes the number of frames, the number of pixels, the shapes of images in the video signals inputted via the connection unit 107 before transmitting the signals to the liquid crystal drive unit 105. The image processing unit 109 includes, for example, an image processing microprocessor. It should be noted that the image processing unit 109 does not have to be a dedicated microprocessor rather, the control unit 108 may be caused by a program stored on the ROM 110 to perform the same operation as the image processing unit 109. The image processing unit 109 is capable of performing processing, such as frame thinning, frame interpolation, resolution conversion, OSD superposition of menus, etc., distortion correction (keystone correction), edge blending, and so on.

The ROM 110 is a non-volatile memory for storing control programs describing the processing procedures performed by the control unit 108, control parameters, a web server program, etc. As used herein, "control programs" and "web server program" refer to the programs to perform the process in the flowchart to be described below.

The RAM 111 is a volatile memory serving as a work memory for temporarily storing control programs and data. The RAM 111 is used to temporarily store video signals inputted via the connection unit 107 and video signals on which the image processing unit 109 performs image processing.

The operation unit 112 is an interface that receives user operations and sends operation signals to the control unit 108. The operation unit 112 includes various operating members, such as switches, dials, and a touch panel disposed on a display unit. Moreover, the operation unit 112 may also receive operation signals transmitted, for example, from a remote controller (not shown) and outputs the received operating signals to the control unit 108. In this embodiment, as shown in FIG. 2, the operation unit 112 includes a variety of operation buttons provided on the enclosure of the projection apparatus 100. The operation unit 112 includes a power button 114, a menu button 115, an enter button 116, an up button 117, a down button 118, a left button 119, a right button 120 etc.

The communication unit 113 is an interface for communicatively connecting with external apparatuses (the other projection apparatuses and the information processing apparatus 200) via the network 50. In this embodiment, the communication unit 113 includes an interface for communicating with the external apparatuses via a so-called wireless LAN or WiMAX, which conform to the IEEE 802.11 standard. The control unit 108 establishes wireless communication with the external apparatuses by controlling the communication unit 113. It should be noted that the communication scheme is not limited to a wireless LAN; for example, Bluetooth® may also be used. Moreover, wire communication, such as Ethernet® or USB (Universal Serial Bus), may also be used.

Furthermore, the communication unit 113 has an AP function (a host machine mode). The AP function is the ability to serve as a wireless access point under the control of the control unit 108. In this embodiment, the AP function of any one of the plurality of projection apparatus (for example, the first projection apparatus 100a) may be activated (to serve as a host machine) to allow the host machine and the slave machines to have direct wireless communication with each other. In particular, the other projection apparatuses, when serving as slave machines, (for example, the second and third projection apparatuses 100b and 100c), and the information processing apparatus 200 can perform direct wireless communication with the first projection apparatus 100a by connecting with the communication unit 113 of the first projection apparatus 100a, which serves as the host machine.

The control unit 108 is capable of transmitting and receiving control commands (for power/lamp control, input switchover instruction, various image processing, and acquisition and change of various set values, for example) to and from the information processing apparatus 200 via the communication unit 113. The control unit 108 additionally serves as a web server to perform HTTP (Hypertext Transfer Protocol) communication with the web browser installed on the information processing apparatus 200 via the communication unit 113. The control unit 108 causes the web server program to generate a web page and delivers it to the information processing apparatus 200 via the communication unit 113. The user can operate the web page in the web browser of the information processing apparatus 200. When the user operates the web page in the web browser of the information processing apparatus 200, the information processing apparatus 200 issues an HTTP request, which is a control command corresponding to the operation of that web page. In this way, through HTTP communication via the web page, the same control processing as the aforementioned control command can be executed on the projection apparatus that is the originator of the web page. Additionally, in this embodiment, through HTTP communication via a web page, an HTTP request can be issued not only to the originating projection apparatus, but also to all the projection apparatuses that have a predetermined relationship with the originating projection apparatus (i.e., belonging to the same group).

(Description of Operation)

Next, the basic operation of the projection apparatus 100 of this embodiment will be described.

Upon receiving a power ON instruction due to user operation on the operation unit 112 or the remote controller (not shown), the control unit 108 performs control to supply power to each unit of the projection apparatus 100.

The connection unit 107 detects whether or not video signals are being inputted from an external apparatus, such as the image output apparatus. If no video signals are inputted to the connection unit 107, the control unit 108 stands by until video signals are inputted, and the control unit 108 performs projection processing when video signals are inputted. To perform projection processing, the video signals inputted via the connection unit 107 are sent to the image processing unit 109, where the signals are subjected to the above-described various processing, and then sent to the liquid crystal drive unit 105. The liquid crystal drive unit 105 controls the transmittance of the liquid crystal panels 102 based on the inputted video signals so that the transmittance corresponds to the gradation level of each of the RGB color components. Then, the light source control unit 104 is caused to control the output of light from the light source 103. The light outputted by the light source 103 is split into red (R), green (G), and blue (B) to supply the light of each color to the liquid crystal panel 102 for the color. The quantity of the light of each color supplied to the liquid crystal panel 102 is limited as it is transmitted through each pixel of the liquid crystal panel 102. Subsequently, the lights of the red (R), green (G), and blue (B) colors transmitted through the liquid crystal panels 102 are recombined by a prism (not shown) and projected onto a screen via the projection optical system 101.

The control unit 108 additionally serves as a web server to perform HTTP communication with the web browser installed on the information processing apparatus 200 via the communication unit 113. The control unit 108 causes the web server program to generate a web page and delivers it to the information processing apparatus 200 via the communication unit 113. When the user operates the web page in the web browser of the information processing apparatus 200, an HTTP request, which is a control command corresponding to the operation of that web page, is issued to the projection apparatus 100, which is the originator of the web page. Upon receiving the HTTP request via the web page, the projection apparatus performs control processing according to the HTTP request, a control command.

(Control via Web Pages)

Next, the control processing of the projection apparatuses through HTTP communication via web pages according this embodiment will now be described with reference to FIGS. 3 to 6A-6C.

In the following description, for the convenience of explanation, it is assumed that the first to third projection apparatuses 100a, 100b, and 100c and the information processing apparatus 200 are located on the same network and capable of communicating with one another.

Figure 4:
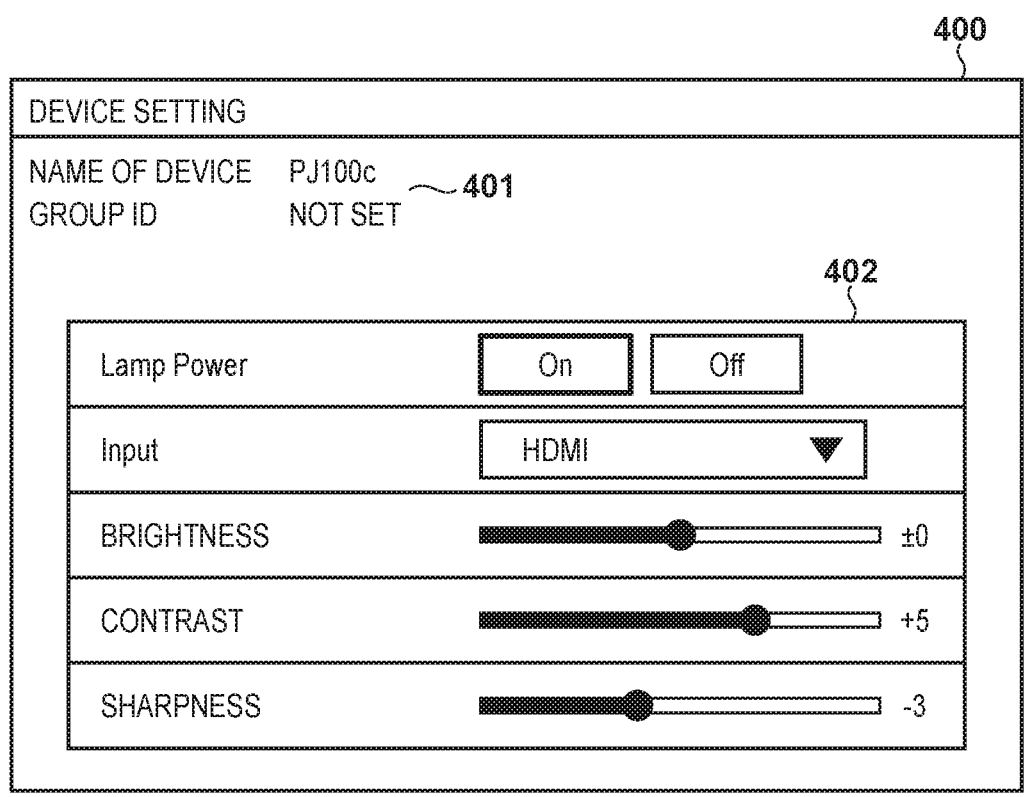
FIG. 4 is a view illustrating an exemplary web page for individual control generated by the projection apparatuses of the embodiment.

It is also assumed that, in the first to third projection apparatuses 100a, 100b, and 100c, the web server program is being executed to deliver a first web page 400 for individual control on which no group ID is set in its initial state as shown in FIG. 4. It is additionally assumed that the user can perform various control processing on the first to third projection apparatuses 100a, 100b, and 100c by operating the web pages delivered by the first to third projection apparatuses 100a, 100, and 100c in the web browser of the information processing apparatus 200.

Moreover, it is assumed that the first and second projection apparatuses 100a and 100b are performing multiple projection as shown in FIG. 1. It is further assumed that "Group-A" as a common group ID has been set for the first and second projection apparatuses 100a and 100b in advance by a user operation and stored in the ROM 110. Meanwhile, it is further assumed that, although the third projection apparatus 100c is located on the same network as the first projection apparatus 100a and the second projection apparatus 100b and the information processing apparatus 200, the third projection apparatus 100c is not involved in the multiple projection with no group ID set for it.

Figure 3:
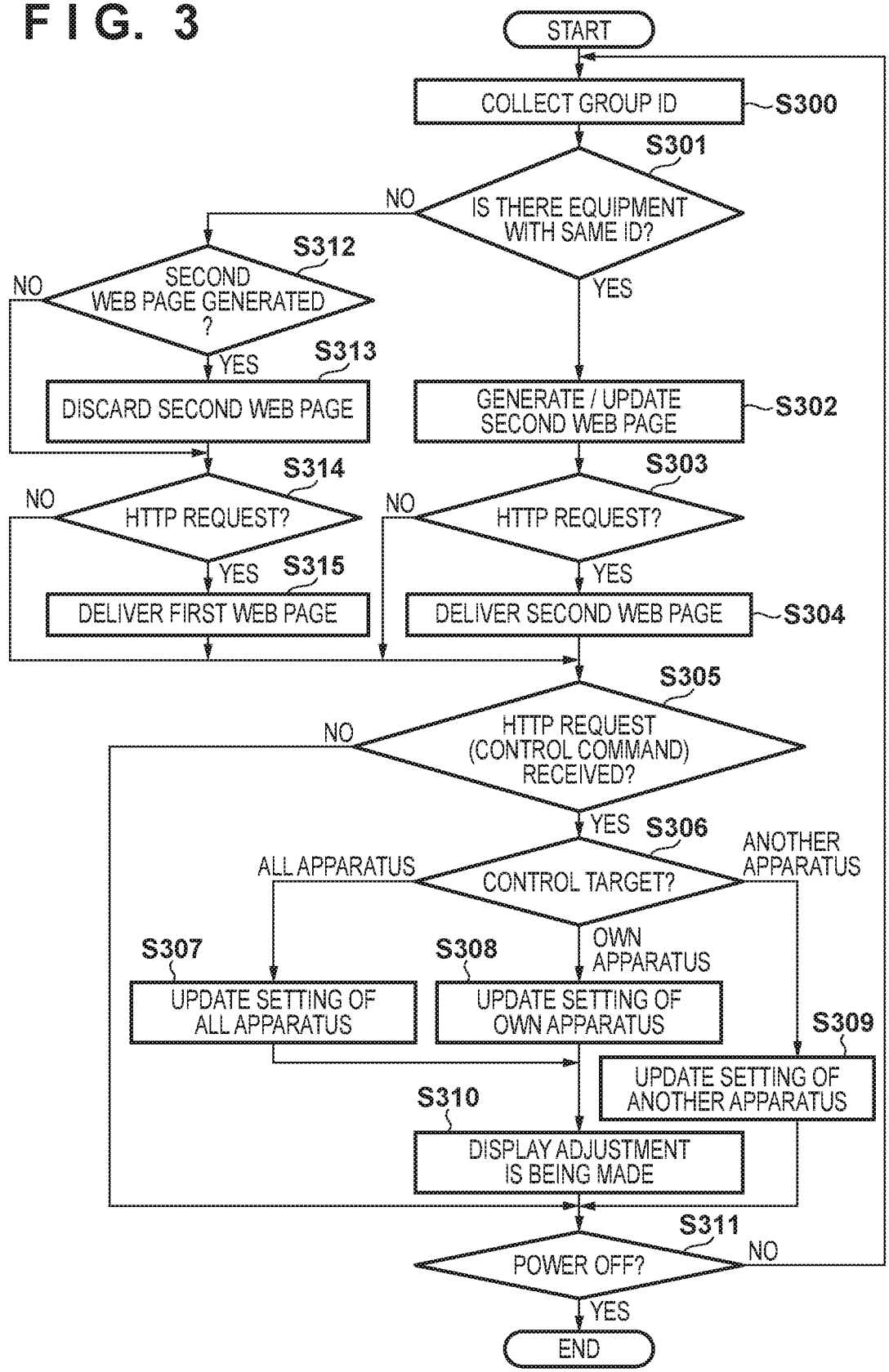
FIG. 3 is a flowchart showing control processing of the projection apparatuses of the embodiment.

An exemplary operation of the first projection apparatus 100a will be described hereinafter with reference to FIG. 3. The process shown in FIG. 3 is started once the power source is turned on to activate the communication unit 113 and implemented by the control unit 108 developing and executing the control programs stored on the ROM.

In step S300, the control unit 108 controls the communication apparatus 113 to broadcast a request packet for acquiring a group ID to the apparatuses (the second projection apparatus 100b, the third projection apparatus 100c, and the information processing apparatus 200 in this example) that are located on the same network as the first projection apparatus 100a. Then, the control unit 108 receives the group IDs included in the responses transmitted by the second and third projection apparatuses 100b and 100c to the request transmitted by the communication unit 113 and proceeds to step S301. Although omitted from FIG. 3, if the first projection apparatus 100a receives a request to acquire a group ID from another projection apparatus (the second projection apparatus 100b or the third projection apparatus 100c in this example), the control unit 108 reads out the group ID set in the first projection apparatus 100a from the ROM 110 and transmits a response containing the group ID to the requesting apparatus.

In step S301, the control unit 108 compares the group IDs of the second and third projection apparatuses 1001) and 100c received in step S300 with the group ID of the first projection apparatus 100a to determine whether or not any of the projection apparatuses have a matching group ID. The process proceeds to step S302 if there is a projection apparatus with a matching group ID and proceeds to step S312 if there is no projection apparatus with a matching group ID In this process, as the group ID acquired from the second project apparatus 100b matches that of the first projection apparatus 100a in step S300, the process proceeds to step S302.

In step S302, the control unit 108 generates or updates the web page capable of controlling all the projection apparatuses having the same group ID ("second web page" hereinafter) and proceeds to step S303. In this process, the control unit 108 newly generates a second web page if no second web page has been generated and, if a second web page has already been generated, updates the second web page.

In step S303, the control unit 108 monitors the communication status of the communication unit 113 to determine whether not an HTTP request for a web page has been received from the information processing apparatus 200 and proceeds to step S304 if an HTTP request has been received and proceeds to step S305 if no HTTP request has been received.

In step S304, the control unit 108 controls the communication unit 113 to deliver the second web page generated or updated in step S302 to the equipment that requested the web page in step S303 (the information processing apparatus 200) and proceeds to step S305.

The first web page 400 delivered in the initial state and the second web page 500 generated or updated in step S302 will now be described with reference to FIGS. 4 and 5A-5C.

FIG. 4 illustrates an exemplary first web page 400 delivered from each projection apparatus in the initial state. In FIG. 4, the region 401 contains the name of the apparatus that is the originator of the web page ("PJ100c" in this example) and the group ID ("Not Set" in this example), The region 402 contains the settable items and set values of the projection apparatus. The region 402 contains from the top to the bottom a button for controlling the ON/OFF of the projection lamp, a drop-down list for selecting the video signal interface to be displayed, and slide bars for adjusting the brightness, contrast, and sharpness, etc.

If the user operates any item in the region 402 of the first web page 400 in the web browser of the information processing apparatus 200, an HTTP request for change of setting corresponding to that operation is transmitted to the projection apparatus that originated the web page (the control target).

Figure 5A:
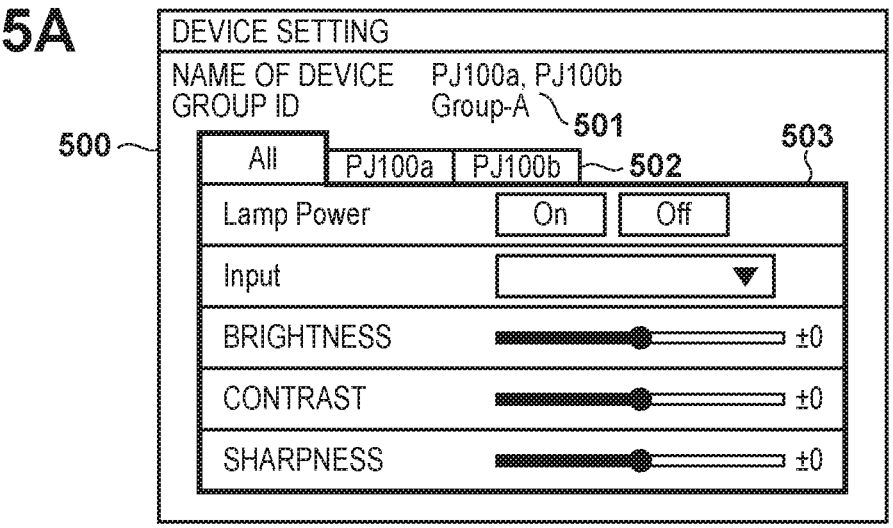
FIGS. 5A-5C are views illustrating an exemplary web page for collective control generated by the projection apparatuses of the embodiment.
Figure 5B:
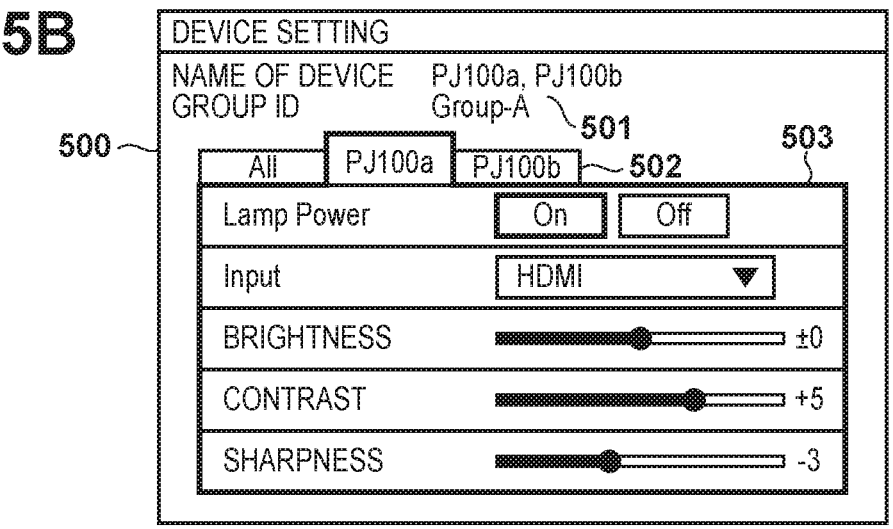
Figure 5C:
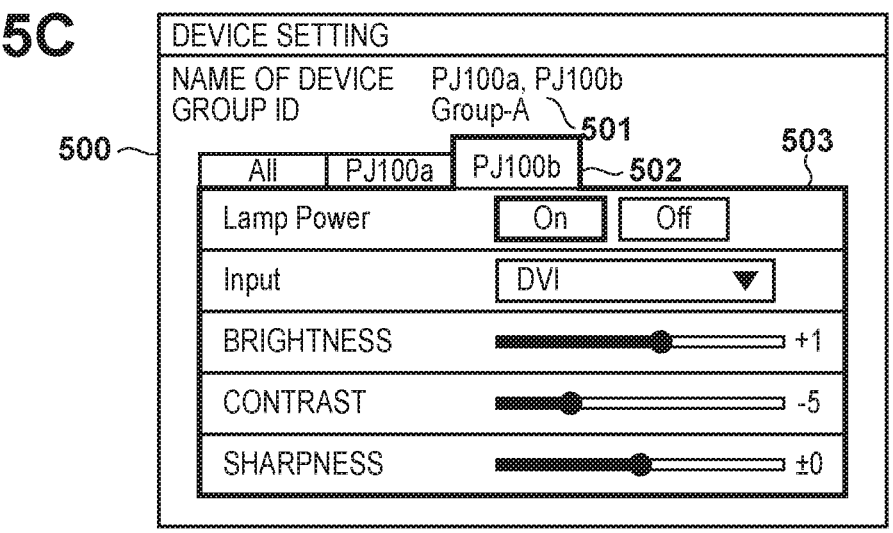

FIGS. 5A-5C illustrate an exemplary second web page 500 delivered by any of the projection apparatuses belonging to the same group. In FIGS. 5A-5C, the region 501 contains the names of the projection apparatuses having the same group ID as the apparatus that is the originator of the web page ("PJ100a" and "PJ100b" in this example) and the group ID ("Group-A" in this example). The tabs 502 allow for selection of the projection apparatuses that are the control targets. The region 503 contains the settable items and set values of the projection apparatuses as in the region 402 on the first web page 400 in FIG. 4.

FIG. 5A illustrates that "All" is selected from the tabs 502 on the second web page 500 in the web browser of the information processing apparatus 200. On the second web page 500 in FIG. 5A, if operation is performed on any of the setting items in the region 503, an HTTP request to perform the control processing corresponding to that operation on all the projection apparatuses having the same group ID (the first projection apparatus 100a and the second projection apparatus 100b in this example) is transmitted to the first projection apparatus 100a, which is the originator of the second web page 500. The first projection apparatus 100a generates an HTTP request for performing the same control processing as that performed in itself, specifying all the projection apparatus in the same group as the control targets, and transmits the request to these projection apparatuses.

FIG. 5B illustrates that the first projection apparatus 100a is selected from the tabs 502 on the second web page 500 in the web browser of the information processing apparatus 200. On the second web page 500 in FIG. 5B, if operation is performed on any of the setting items in the region 503, an HTTP request to perform the control processing corresponding to that operation on the projection apparatus, i.e., the control target (the first projection apparatus 100a in this example) is transmitted to the first projection apparatus 100a.

FIG. 5C illustrates that the second projection apparatus 100b is selected from the tabs 502 on the second web page 500 in the web browser of the information processing apparatus 200. On the second web page 500 in FIG. 5C, if operation is performed on any of the setting items in the region 503, an HTTP request to perform the control processing corresponding to that operation on the projection apparatus, i.e., the control target (the second projection apparatus 100b in this example) is transmitted to the first projection apparatus 100a, which is the originator of the second web page 500. The first projection apparatus 100a generates an HTTP request for performing the control processing corresponding to that operation, specifying the second projection apparatus 100b as the control target, and transmits the request to the second projection apparatus 100b.

It should be noted that, while the second web page 500 is illustrated as a web page delivered by the first projection apparatus 100a in this embodiment, it can also be a web page delivered by the second projection apparatus 100b, which has the same group ID as the first projection apparatus 100a.

In this way, when the user operates the first web page 400 shown in FIG. 4 in the web browser of the information processing apparatus 200, an HTTP request can be issued to the projection apparatus that is the originator of the first web page 400 so as to perform individual control.

Additionally, based on the second web page 500 shown in FIGS. 5A-5C, an HTTP request can be issued not only to the originating projection apparatus, but also to all the projection apparatuses that have the same group ID as the originating projection apparatus so as to perform collective control.

Referring again to FIG. 3, in step S305, the control unit 108 monitors the communication status of the communication unit 113 to determine whether or not an HTTP request, i.e., a control command delivered via a web page in step S304 or step S315 (which will be described below), has been received. The control unit 108 proceeds to step S306 if a control command has been received and to step S311 if no control command has been received.

In step S306, the control unit 108 analyzes the HTTP request received in step S305. The control unit 108 proceeds to step S307 if the result of the analysis shows that the projection apparatuses specified as the control targets, are all the projection apparatuses that have the same group ID as that of the first projection apparatus 100a (the first projection apparatus 100a and the second projection apparatus 100b). Alternatively, the process proceeds to step S308 if the control target is the originating projection apparatus (the first projection apparatus 100a). Alternatively, the process proceeds to step S309 if the control target is another projection apparatus (the second projection apparatus 100b). To illustrate the above by using the second web page 500 delivered by the first projection apparatus 100a in step S304 as an example, the process proceeds to step S307 if "All" is selected from the tables 502 on the second web page 500 in the web browser of the information processing apparatus 200 as shown in FIG. 5A. The process proceeds to step S308 if any of the setting items in the region 503 is operated while the first projection apparatus 100a is selected from the tabs 502 on the second web page 500 in the web browser of the information processing apparatus 200 as shown in FIG. 5B. The process proceeds to step S309 if any of the setting items in the region 503 is operated while the second projection apparatus 100b is selected from the tabs 502 on the second web page 500 in the web browser of the information processing apparatus 200 as shown in FIG. 5C.

In step S307, the control unit 108 analyzes the HTTP request received in step S305 and performs the control processing that corresponds to that HTTP request on the own apparatus (the projection apparatus 100a). Furthermore, the control unit 108 generates an WIMP request for performing the same control processing as that performed on the own apparatus, specifying the other projection apparatus belonging to the same group (the second projection apparatus 100b) as the control target. Then, the control unit 108 controls the communication unit 113 to transmit the HTTP request thus generated to the other projection apparatus and proceeds to step S310.

In step S308 as in step S307, the control unit 108 performs on the own apparatus the control processing that corresponds to the HTTP request received in step S305 and proceeds to step S310.

In step S309, the control unit 108 analyzes the HTTP request received in step S305 to identify the other projection apparatus specified as the control target (the second projection apparatus 100b). In addition, the control unit 108 transmits an HTTP request for performing the same control processing as the received HTTP request to the other projection apparatus specified as the control target (the second projection apparatus 100b) via the communication unit 113 and proceeds to step S311.

In step S310, the control unit 108 controls the image processing unit 109 to display the OSD that indicates the control processing is underway.

Figure 6A:
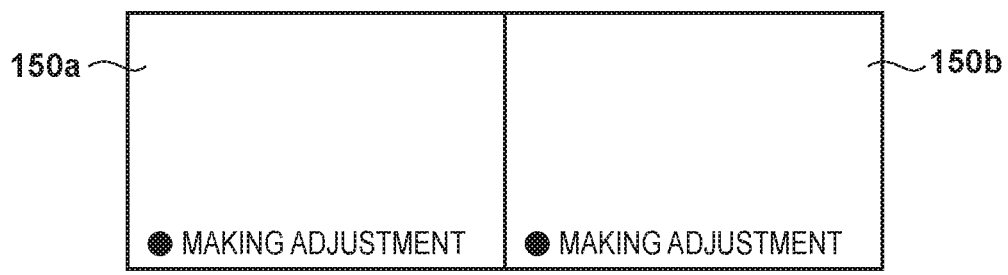
FIGS. 6A-6C are views illustrating an exemplary multiple projection screen of the embodiment.
Figure 6B:
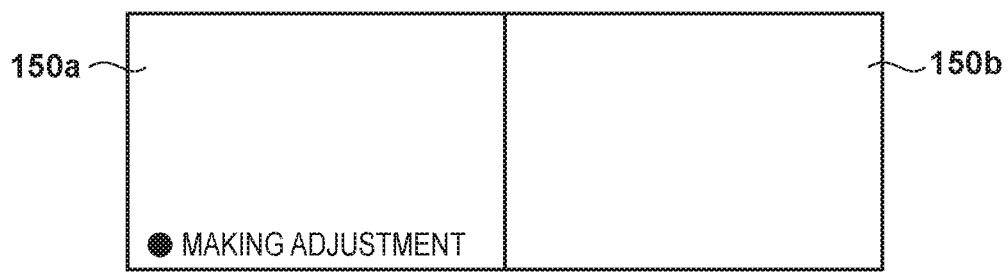
Figure 6C:
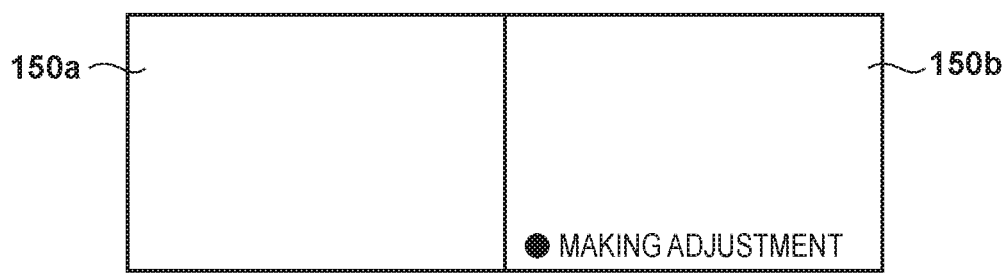

FIGS. 6A-6C illustrate examples of the projection screen 150a of the first projection apparatus 100a and the projection screen 150b of the second projection apparatus 100b in the multiple projection mode shown in FIG. 1 after an HTTP request, i.e., a control command, is received in step S305.

FIG. 6A illustrates a multiple projection screen when "All" is selected from the tabs 502 on the second web page 500 in the web browser of the information processing apparatus 200. In this case, after performing control processing on itself (step S307), the first projection apparatus 100a displays an OSD that indicates adjustment is underway in step S310. Additionally, the first projection apparatus 100a transmits to the second projection apparatus 100b an HTTP request for performing the same control processing as that performed on itself in step S307. When the second projection apparatus 100b receives an HTTP request transmitted by the first projection apparatus 100a (step S305), the apparatus itself (the second projection apparatus 100b) becomes the control target in step S306. Therefore, after performing control processing on itself in step S308, this projection apparatus displays an OSD that indicates adjustment is underway in step S310. In this way, as shown in FIG. 6A, the first and second projection apparatuses 100a and 100 both display an OSD.

FIG. 6B illustrates the multiple projection screen when the first projection apparatus 100a is selected from the tabs 502 on the second web page 500 in the web browser of the information processing apparatus 200. In this case, after performing control processing on itself in step S308, the first projection apparatus 100a displays the OSD that indicates adjustment is underway in step S310. In this way, as shown in FIG. 6B, only the first projection apparatus 100a displays an OSD.

FIG. 6C illustrates the multiple projection screen when the second projection apparatus 100b is selected from the tabs 502 on the second web page 500 in the web browser of the information processing apparatus 200. In this case, when the second projection apparatus 100b receives an HTTP request (step S305), the apparatus itself (the second projection apparatus 100b) becomes the control target in step S306. Therefore, after performing control processing on itself in step S308, this projection apparatus displays the OSD that indicates adjustment is underway in step S310. In this way, as shown in FIG. 6C, only the second projection apparatus 100b displays an OSD.

As described above, the user can easily identify which a projection apparatus is the control target on a web page based on the OSD display on the projection screen.

Referring again to FIG. 3, in step S311, the control unit 108 determines whether or not a power OFF request has been given by the operation unit 112 in response to a user operation and terminates this process if a power OFF request has been given and returns to step S300 if no power OFF request has been given.

The following describes the process when projection apparatuses with the same group ID no longer exist after a second web page 500 is generated in step S302, for example, when the power to the second projection apparatus 100b is switched off.

In this case, in step S301, the control unit 108 proceeds to step S312 as no projection apparatuses with the same group ID exist on the network.

In step S312, the control unit 108 determines whether or not a second web page 500 has been generated and, if so, proceeds to step S313 and, if not, proceeds to step S314. The process proceeds to step S313 as this occurs after a second web page 500 was already generated in step S302.

In step S313, the control unit 108 discards the second web page 500 and proceeds to step S314.

In step S314, the control unit 108 monitors the communication status of the communication unit 113 to determine whether not an HTTP request for a web page has been received from the information processing apparatus 200 and proceeds to step S315 if an HTTP request has been received and proceeds to step S305 if no HTTP request has been received.

In step S315, the control unit 108 controls the communication unit 113 to deliver the first web page 400 to the equipment that requested the web page in step S314 (the information processing apparatus 200) and proceeds to step S305. The first web page 400 delivered in this step is the same as what is shown in FIG. 4, with the first projection apparatus 100a set as the name of the apparatus and "Group-A" as the group ID set in the region 401. In this way, when projection apparatuses with the same group ID no longer exist on the same network, the first projection apparatus 100a discards the second web page 500, which was generated for collectively controlling projection apparatuses with the same group ID. Accordingly, only possible control is individual control of a projection apparatus via the first web page 400 in the web browser of the information processing apparatus 200.

It should be noted that if a new projection apparatus with the same group ID is found, the first projection apparatus 100a may update the second web page 500 in step S302 by setting the name of the newly found projection apparatus in the region 501 of the second web page 500 shown in FIGS. 5A-5C and adding the newly found projection apparatus to the tabs 502 as a selectable control target.

The following describes the operation of a projection apparatus for which no group ID is set (for example, the third projection apparatus 100c).

In this case, it is determined NO in step S301 and it is also determined NO in step S312, Therefore, upon receiving an HTTP request in step S314, the third projection apparatus 100c delivers, in step S315, a first web page with the name of the third projection apparatus 100c and no group ID set thereon in the region 401 shown in FIG. 4. In this case, in the control performed via the first web page 400, the control target will always be the apparatus that is the originator of the web page, so that the process always proceeds to step S308 as a result of step S306 to determine the control target.

As described above, to perform multiple projection, in which a plurality of projection apparatuses are used to project images, according to this embodiment, collective control of all the projection apparatuses and individual control of each of the projection apparatuses can be performed in an efficient manner.

Other Embodiments

While the foregoing embodiment has been described using a projection system as an example, the present invention can also be applied to other types of systems. For example, so-called display apparatuses may be used instead of projection apparatuses as controlled apparatuses. Furthermore, the present invention can also be applied to the setting of image-capturing and light-emission parameters in a system where a plurality of cameras shoot a photograph in unison and in a system where stroboscopes fire a flash in unison. Furthermore, the present invention can also be applied to the control of various settings for a plurality of facilities installed in offices and factories (such as the temperature settings for air-conditioners, the paper settings for printers, and the operating parameters and the operation schedules of industrial machinery).

Embodiment(s) of the present invention can also be realized by a computer of a system or apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155879, filed Aug. 10, 2017 which is hereby incorporated by reference herein in its entirety.

What is claimed is:

1. A controlled apparatus that operates as a first controlled apparatus, comprising:
   a communication unit configured to communicate with a second controlled apparatus;
   a detection unit configured to detect a second controlled apparatus having a predetermined relationship with the first controlled apparatus via the communication unit; and
   a control unit configured to
      generate a first web page capable of controlling the first controlled apparatus if the detection unit has not detected the second controlled apparatus having the predetermined relationship, and
      generate a second web page capable of collectively controlling the first controlled apparatus and the second controlled apparatus, if the detection unit has detected the second controlled apparatus having the predetermined relationship,
   wherein the second web page includes a tab capable of collectively controlling the first controlled apparatus and the second controlled apparatus, a tab capable of individually controlling the first controlled apparatus, and a tab capable of individually controlling the second controlled apparatus.

2. The apparatus according to claim 1, wherein the communication unit is capable of communicating with an information processing apparatus for controlling a plurality of controlled apparatuses including the first controlled apparatus and the second controlled apparatus, and in response to a request for a web page from the information processing apparatus, the control unit delivers the first web page or the second web page to the information processing apparatus via the communication unit.

3. The apparatus according to claim 1, wherein the control unit, upon receiving a command via the second web page, transmits a request to perform the same processing as that performed on the first controlled apparatus to the second controlled apparatus having the predetermined relationship.

4. The apparatus according to claim 2, wherein the predetermined relationship is a relationship of having the same group ID, the apparatus further comprises a setting unit configured to set the group ID, the detection unit detects the second controlled apparatus having the predetermined relationship based on the group ID acquired from the second controlled apparatus via the communication unit, and the control unit generates the second web page and delivers the same to the information processing apparatus via the communication unit, if the second controlled apparatus having the predetermined relationship is detected.

5. The apparatus according to claim 1, wherein while the first controlled apparatus is performing processing via the first web page or the second web page, the control unit displays that the processing is underway.

6. The apparatus according to claim 1, wherein the control unit discards the second web page, if no second controlled apparatus having the predetermined relationship is detected via the communication unit after the second web page is generated.

7. The apparatus according to claim 1, wherein
   if another controlled apparatus having the predetermined relationship is newly detected via the communication unit after the second web page is generated, the control unit updates the second web page such that a tab capable of individually controlling the newly detected controlled apparatus is added.

8. The apparatus according to claim 1, wherein the second web page is capable of performing setting common to all the controlled apparatuses having the predetermined relationship and individual setting for each of the controlled apparatuses having the predetermined relationship.

9. The apparatus according to claim 1, wherein the controlled apparatus is a projection apparatus.

10. The apparatus according to claim 9, wherein the control unit performs multiple projection in which a projection screen projected by the first controlled apparatus and a projection screen projected by the second controlled apparatus having the predetermined relationship are joined together to display a single image as a whole.

11. A non-transitory computer-readable storage medium storing a program for causing a computer to function as a controlled apparatus that operates as a first controlled apparatus, comprising:
   a communication unit configured to communicate with a second controlled apparatus;
   a detection unit configured to detect a second controlled apparatus having a predetermined relationship with the first controlled apparatus via the communication unit; and
   a control unit configured to generate a first web page capable of controlling the first controlled apparatus if the detection unit has not detected the second controlled apparatus having the predetermined relationship, and generate a second web page capable of collectively controlling the first controlled apparatus and the second controlled apparatus, if the detection unit has detected the second controlled apparatus having the predetermined relationship, wherein the second web page includes a tab capable of collectively controlling the first controlled apparatus and the second controlled apparatus, a tab capable of individually controlling the first controlled apparatus, and a tab capable of individually controlling the second controlled apparatus.

12. The apparatus according to claim 1, wherein the first controlled apparatus and the second controlled apparatus are projection apparatuses, and the control unit generates the second web page capable of collectively adjusting at least one of a brightness, a contrast and a sharpness of projection screens of the first controlled apparatus and the second controlled apparatus.

\* \* \* \* \*